(12) United States Patent
Huang

(10) Patent No.: US 8,726,960 B1
(45) Date of Patent: May 20, 2014

(54) SEALING MACHINE WITH A TRANSPORTATION STRUCTURE

(71) Applicant: Mao-Sen Huang, Taichung (TW)

(72) Inventor: Mao-Sen Huang, Taichung (TW)

( * ) Notice: Subject to any disclaimer, the term of this patent is extended or adjusted under 35 U.S.C. 154(b) by 0 days.

(21) Appl. No.: 13/762,380

(22) Filed: Feb. 8, 2013

(51) Int. Cl.
*B32B 37/00* (2006.01)

(52) U.S. Cl.
USPC ........... 156/359; 156/553; 156/555; 156/582; 156/583.5; 53/479

(58) Field of Classification Search
USPC ............... 156/359, 553, 555, 580, 581, 582, 156/583.1, 583.5; 53/469, 479, 373.7, 53/371.6, 374.3, 374.4
See application file for complete search history.

(56) References Cited

U.S. PATENT DOCUMENTS

| | | | | |
|---|---|---|---|---|
| 4,680,073 | A | * | 7/1987 | Brunner et al. ............... 156/250 |
| 5,149,393 | A | * | 9/1992 | Hutchinson et al. .......... 156/555 |
| 6,745,543 | B2 | * | 6/2004 | Tillack et al. ................ 53/374.8 |
| 7,647,747 | B2 | * | 1/2010 | Kataoka et al. .............. 53/374.8 |

* cited by examiner

*Primary Examiner* — James Sells

(57) ABSTRACT

A sealing machine with a transportation structure has: a seal unit including an upper transporting set, a lower transporting set, a heating set, and a driving motor. The upper transporting set has a first conveying member, the lower transporting set has a second conveying member driven. The upper transporting set has an upper roller, and the lower transporting set has a lower roller for matching with the upper roller. The heating set has two heating rails and at least one electric bar, and each heating rail horizontally extends at a convey stork of the first conveying member and the second conveying member. Between the two heating rails is defined a slot. An outlet end of the slot corresponds to a pressing surface of the upper roller and the lower roller, the each heating rail has a groove so as to receive the at least one electric bar.

7 Claims, 8 Drawing Sheets

SEALING MACHINE WITH A TRANSPORTATION STRUCTURE

FIELD OF THE INVENTION

The present invention relates to a sealing machine, and more particularly to a sealing machine with a transportation structure which includes an input end and an output end so as to melt and seal an opening of an elongated plastic bag.

BACKGROUND OF THE INVENTION

A conventional vacuum sealing machine contains a movable arm disposed at a central position of a vertical plate on a rear side of a base of the vacuum sealing machine, and the movable arm swings and axially couples with a press bar so as to move with the press bar. The press bar has two sides connecting with a cylinder pillar so that the press bar returns back to an original position automatically. The movable arm has a nozzle cylinder fixed on a bottom end thereof and moving frontward and backward, and a forced lever has a wire secured therein and a heat-resistant cloth covered therearound. Thereby, the sealing machine seals a plastic bag by using the tee movable arm and the press bar. However, a length of the press bar is fixed, so an elongated plastic bag cannot be sealed, and the user has to replace another press bar with a longer length so as to seal the elongated plastic bag, thus having a complicated operation. In addition, the press bar with the longer length will increase a receiving space of the sealing machine.

The present invention has arisen to mitigate and/or obviate the afore-described disadvantages.

SUMMARY OF THE INVENTION

The primary object of the present invention is to provide a sealing machine with a transportation structure which includes an input end and an output end so as to melt and seal an opening of an elongated plastic bag.

To obtain the above objective, a sealing machine with a transportation structure provided by the present invention contains: a seal unit, and the seal unit includes an upper transporting set, a lower transporting set, a heating set, and a driving motor.

The upper transporting set has a first conveying member driven by the driving motor, the lower transporting set has a second conveying member driven by the driving motor, and the first conveying member and the second conveying member are used to clamp an elongated plastic bag, the upper transporting set has an upper roller disposed on an output end thereof, and the lower transporting set has a lower roller mounted on an output end thereof so as to match with the upper roller and used to press an elongated plastic bag which is heated.

The heating set has two heating rails and at least one electric bar, and each heating rail horizontally extends at a convey stork of the first conveying member and the second conveying member, between the two heating rails is defined a slot so as to place the elongated plastic bag which is heated and to correspond to a clamping surface of the first conveying member and the second conveying member, an outlet end of the slot corresponds to a pressing surface of the upper roller and the lower roller, the each heating rail has a groove formed therein so as to receive the at least one electric bar.

Thereby, the elongated plastic bag is horizontally put into two output ends of the first conveying member and the second conveying member, and an opening of the elongated plastic bag corresponds to an inlet end of the slot so that the first conveying member and the second conveying member clamp the elongated plastic bag and convey the elongated plastic bag to two output ends of the upper transporting set and the lower transporting set, and the opening of the elongated plastic bag is melted by the at least one electric bar in the slot, thereafter the elongated plastic bag is removed from the slot and is pressed and sealed by the upper roller and the lower roller.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
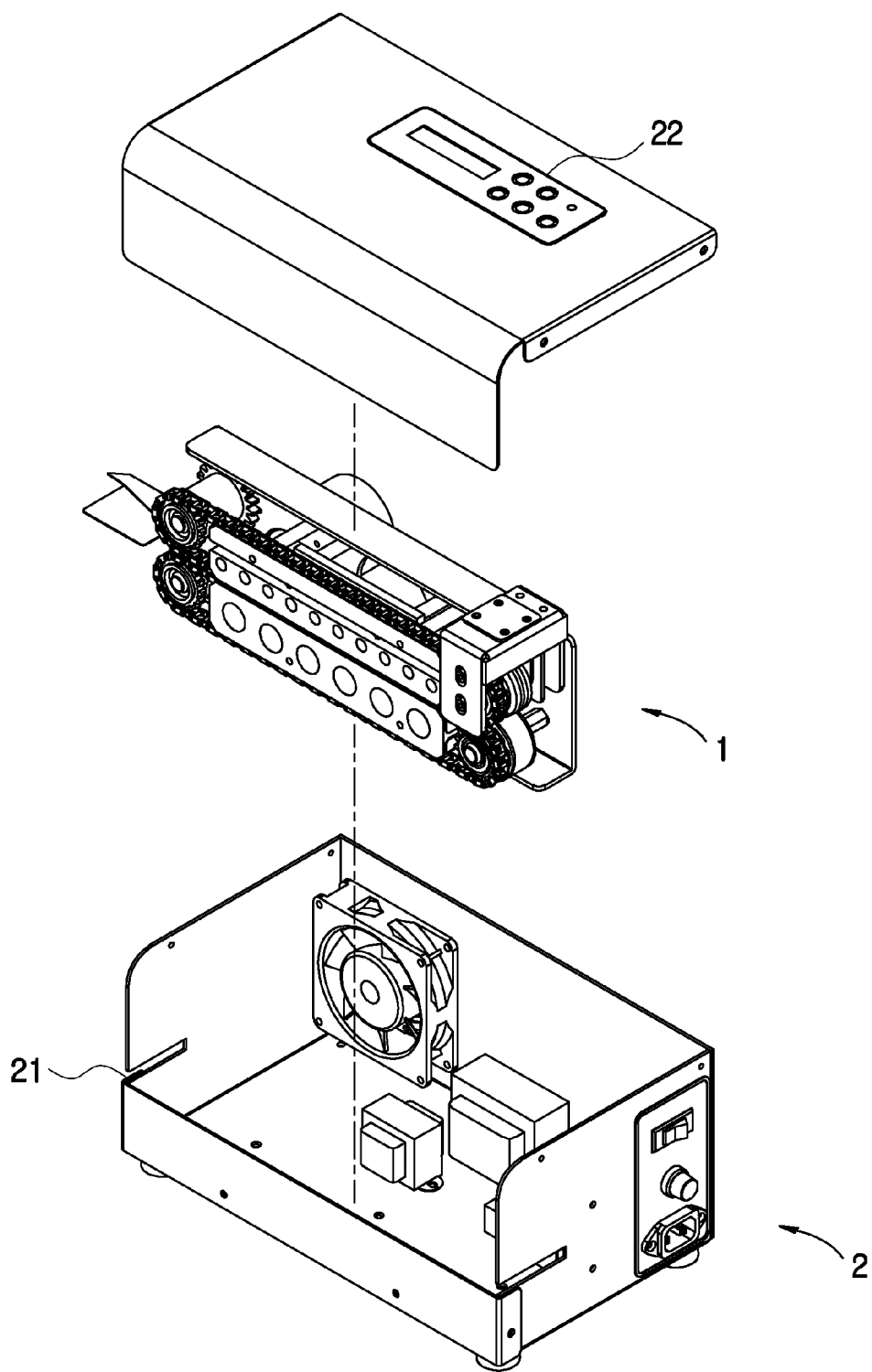
FIG. 1 is a perspective view showing the exploded components of a sealing machine with a transportation structure according to a preferred embodiment of the present invention.
Figure 2:
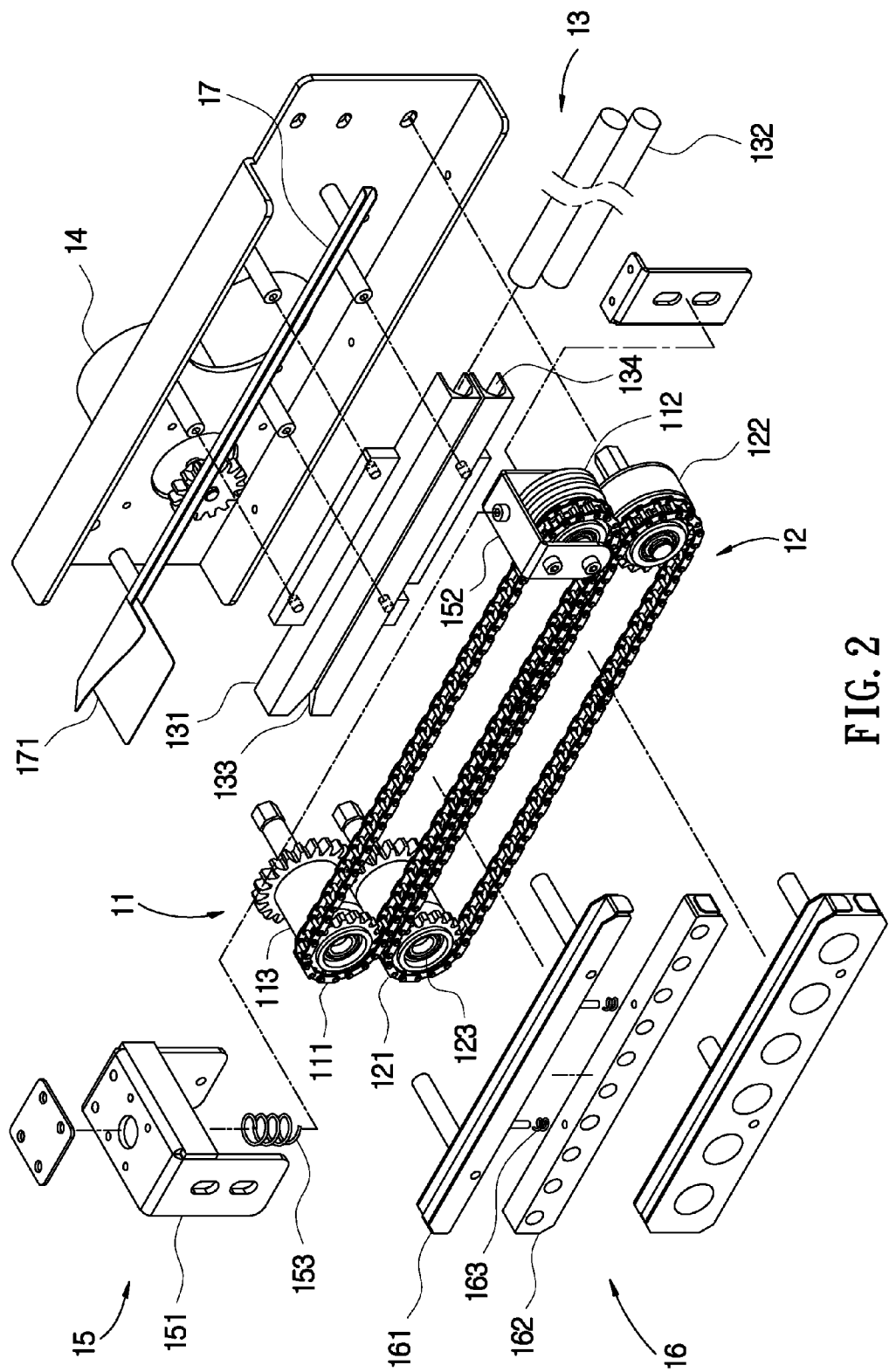
FIG. 2 is a perspective view showing the exploded components of a seal unit of the sealing machine with the transportation structure according to the preferred embodiment of the present invention.
Figure 3:
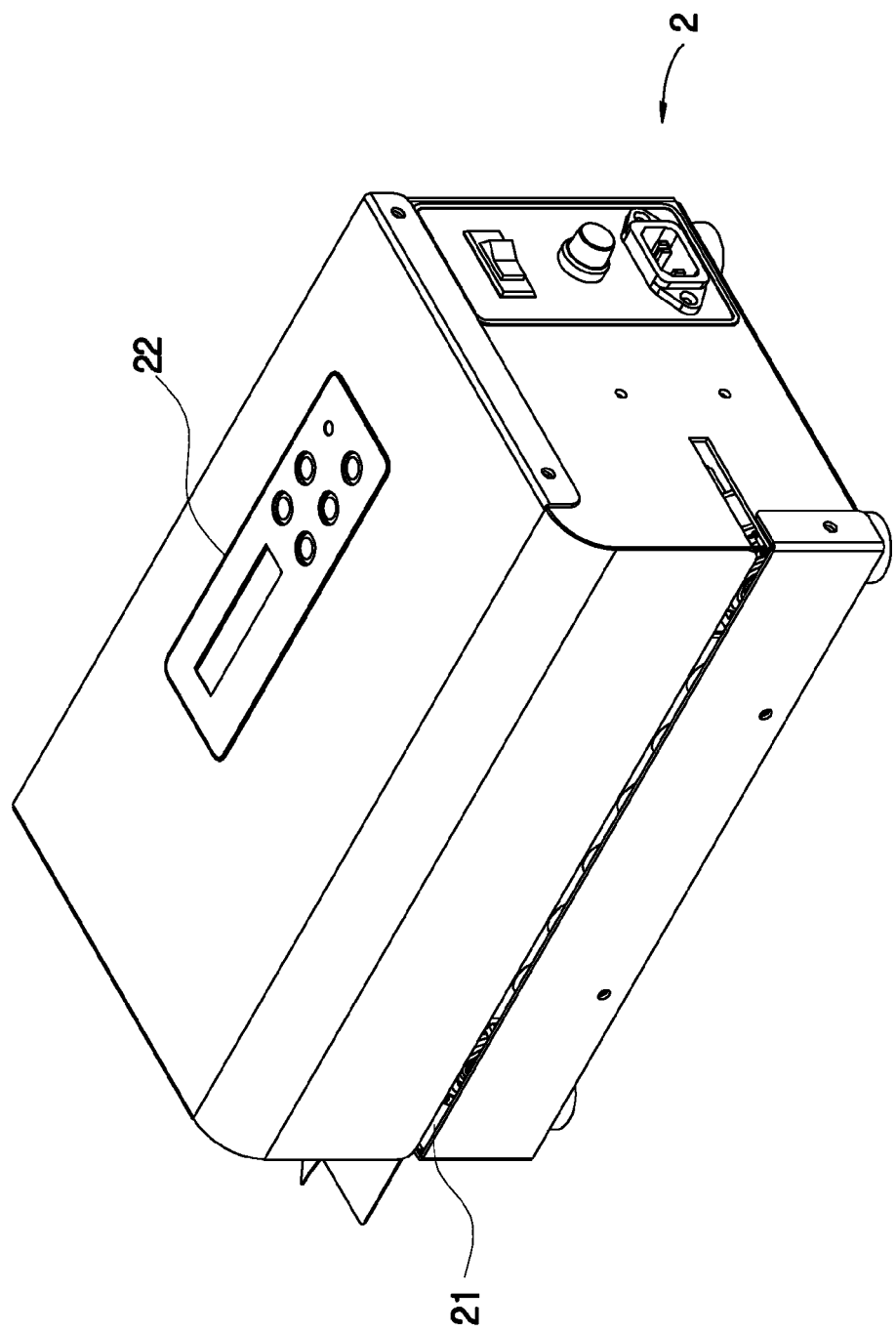
FIG. 3 is a perspective view showing the assembly of the sealing machine with the transportation structure according to the preferred embodiment of the present invention.
Figure 4:
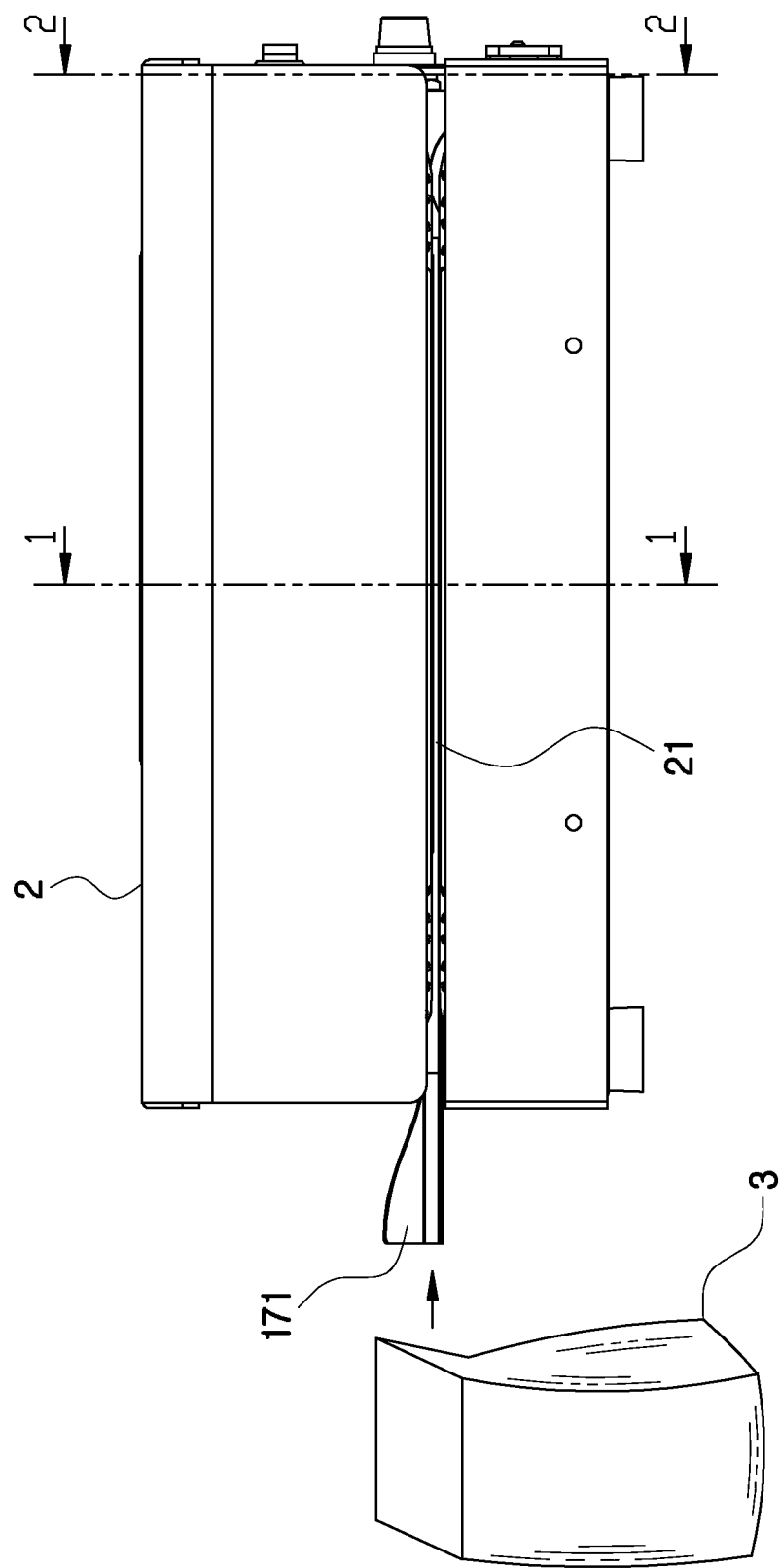
FIG. 4 is a plan view showing the operation of the sealing machine with the transportation structure according to the preferred embodiment of the present invention.
Figure 5:
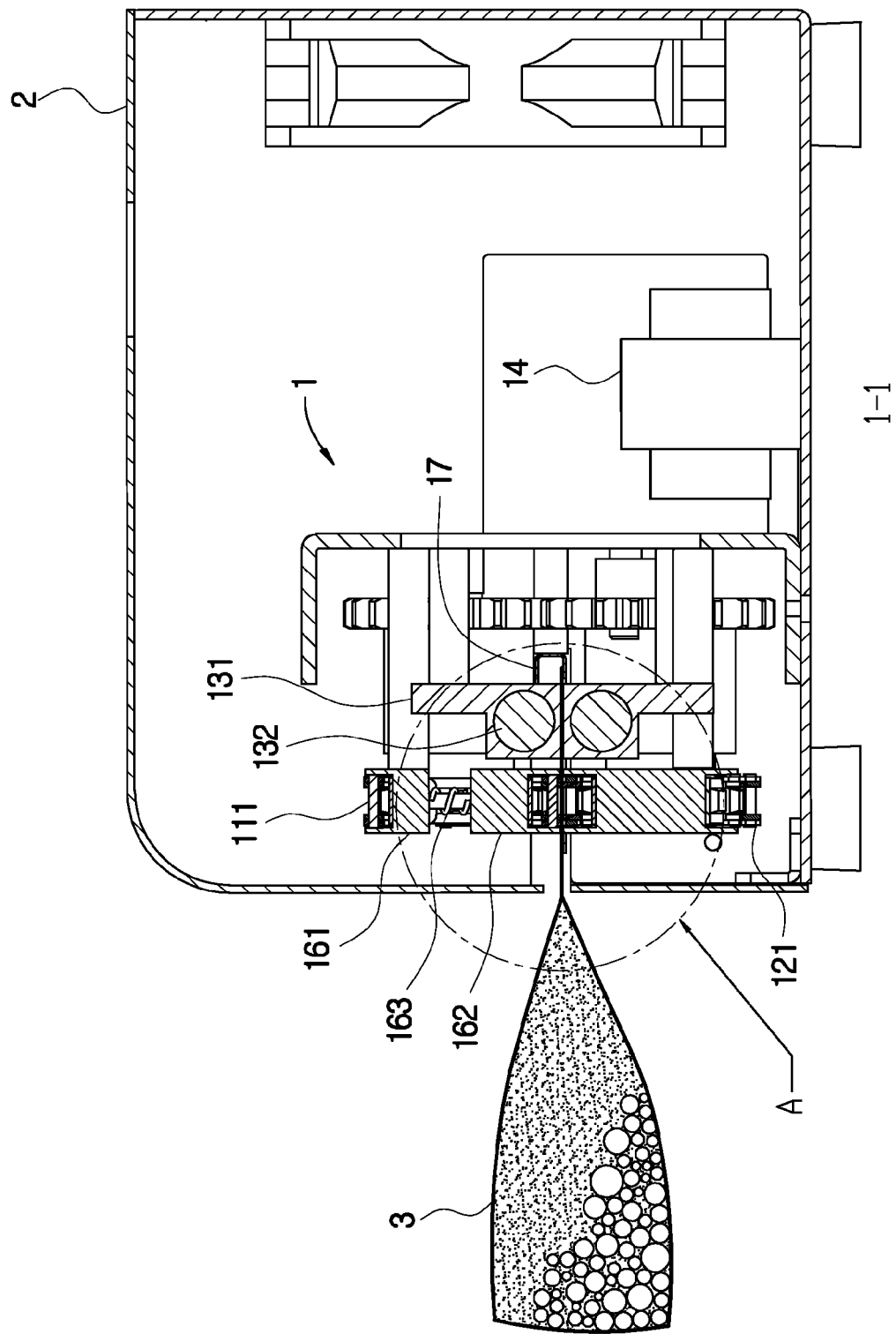
FIG. 5 is a cross sectional view taken along the lines 1-1 of FIG. 4.
Figure 6:
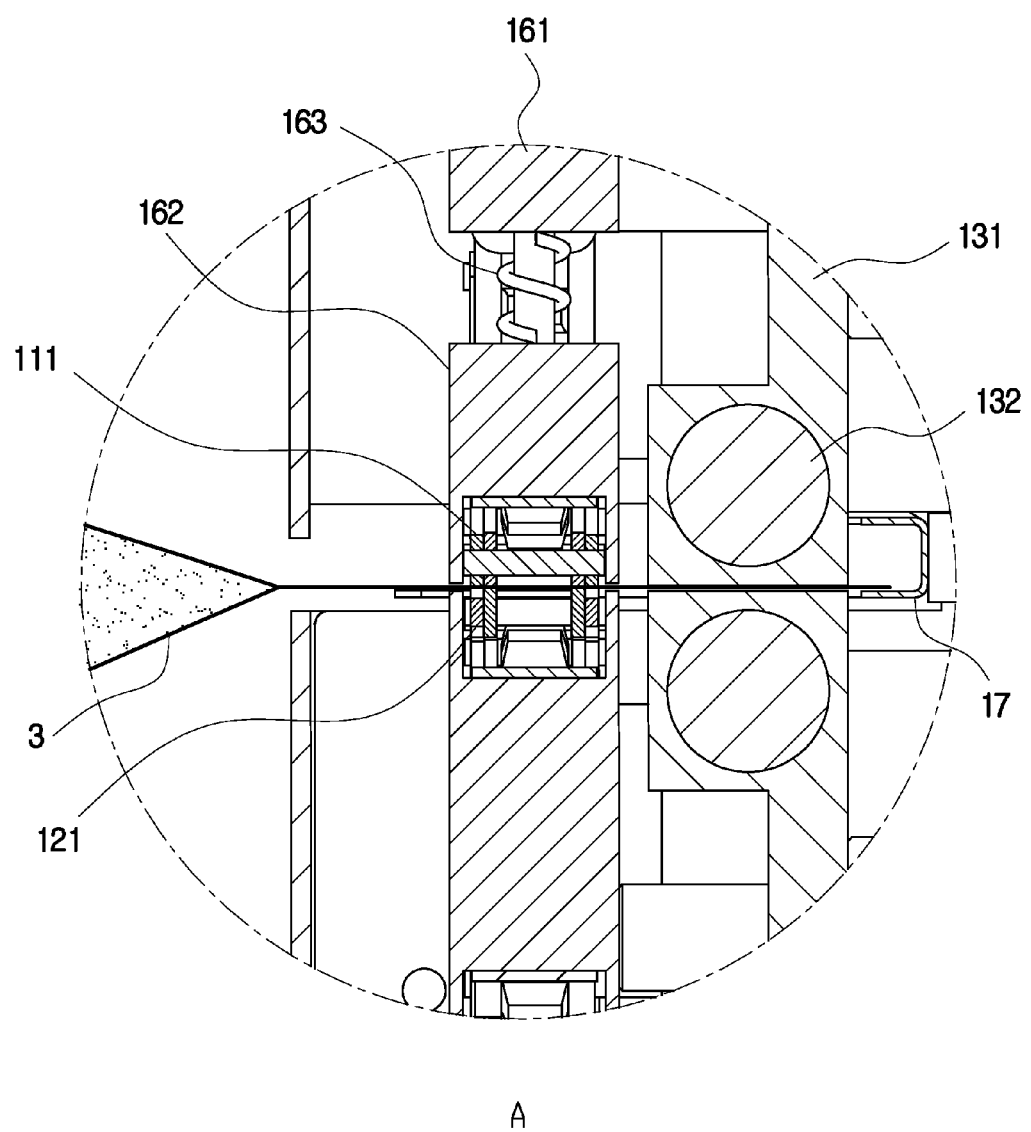
FIG. 6 is an amplified cross sectional view showing an A portion of FIG. 5.
Figure 7:
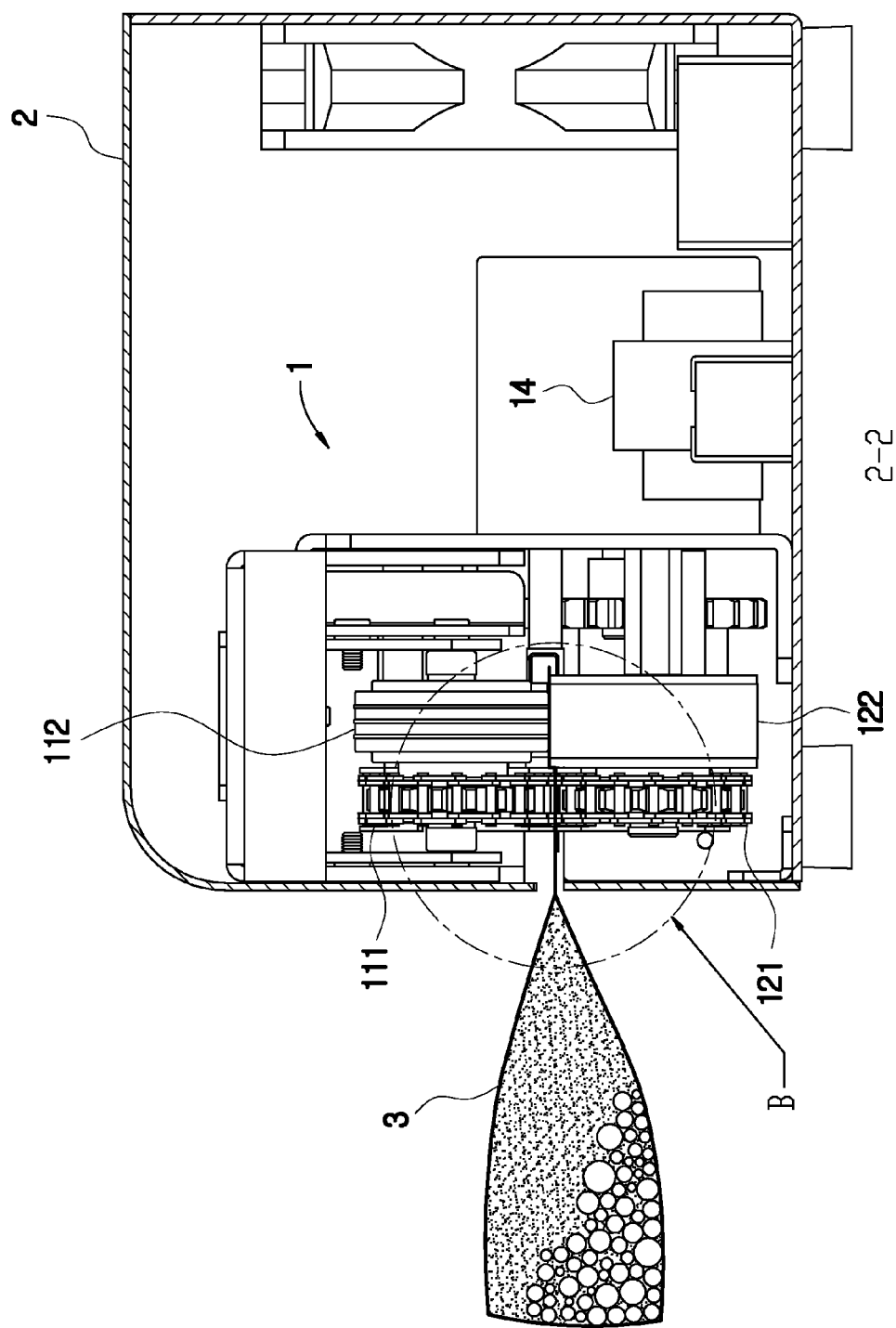
FIG. 7 is a cross sectional view taken along the lines 2-2 of FIG. 4.
Figure 8:
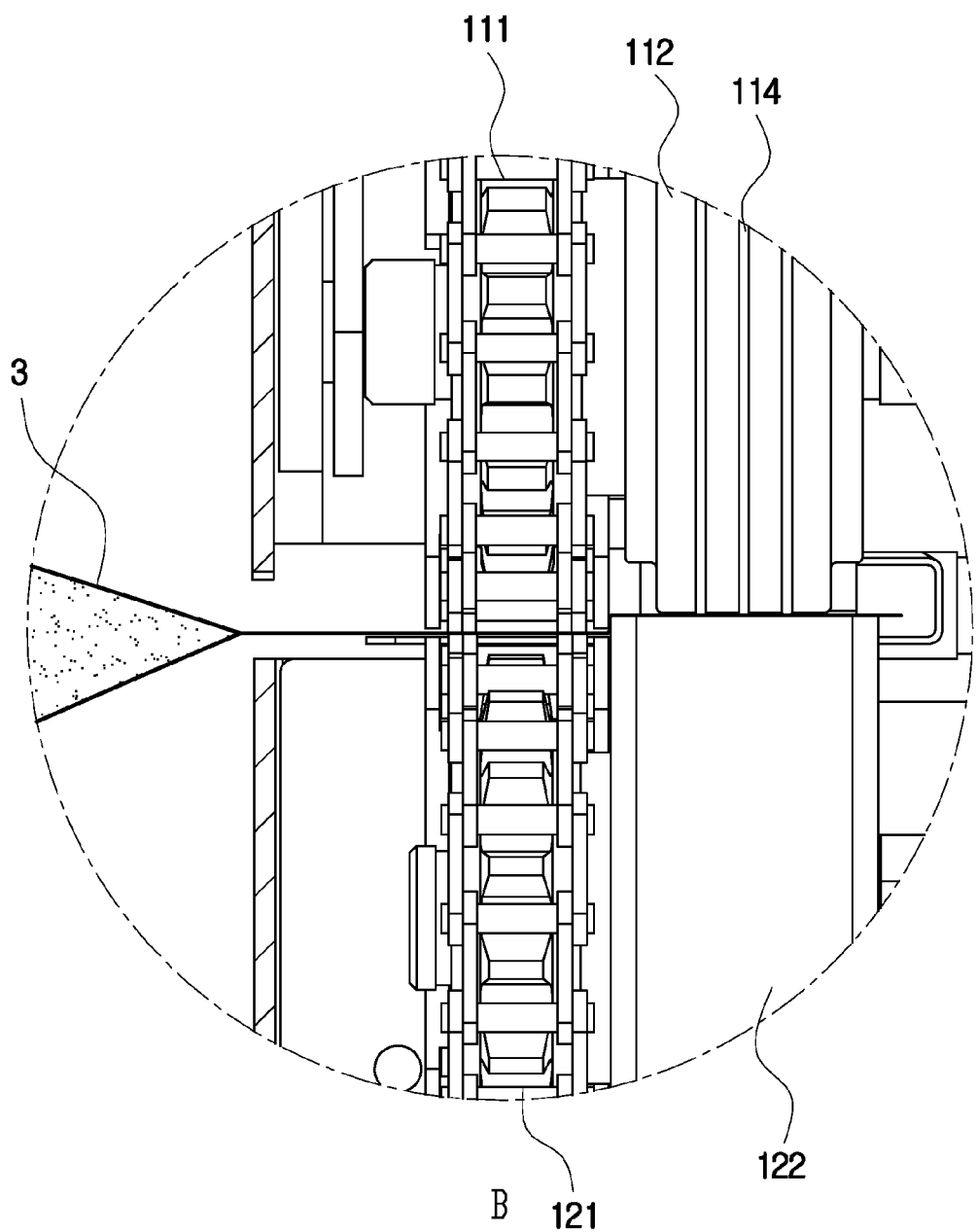
FIG. 8 is an amplified cross sectional view showing a B portion of FIG. 7.

With reference to FIGS. 1-8, a sealing machine with a transportation structure according to a preferred embodiment of the present invention comprises a seal unit 1, and the seal unit 1 includes an upper transporting set 11, a lower transporting set 12, a heating set 13, and a driving motor 14.

The upper transporting set 11 has a first conveying member 111 driven by the driving motor 14, the lower transporting set 12 has a second conveying member 121 driven by the driving motor 14 (the first conveying member and the second conveying member are a conveying chain has a heat-resistant effect), and the first conveying member 111 and the second conveying member 121 are used to clamp an elongated plastic bag 3, the upper transporting set 11 has an upper roller 112 disposed on an output end thereof, and the lower transporting set 12 has a lower roller 122 mounted on an output end thereof so as to match with the upper roller 112 and used to press an elongated plastic bag 3 which is heated.

The heating set 13 has two heating rails 131 and at least one electric bar 132 (there are two electric bars provided in this embodiment), and each heating rail 131 horizontally extends along a conveying track of the first conveying member 111 and the second conveying member 121. Between two input ends of the two heating rails 131 is defined a slot 133 so as to place the elongated plastic bag 3 which is heated and to correspond to a clamping surface of the first conveying member 111 and the second conveying member 121; an outlet end of the slot 133 corresponds to a pressing surface of the upper roller 112 and the lower roller 122. Each heating rail 131 has a groove 134 formed therein so as to receive the at least one electric bar (heating element) 132.

In addition, the upper transporting set 11 also has a first guiding roller 113, and two ends of the first conveying member 111 fit with the upper roller 112 and the first guiding roller 113, the lower transporting set 12 has a second guiding roller 123, and two ends of the second conveying member 121 fit with the lower roller 122 and the second guiding roller 123, the first guiding roller 113 meshes with the second guiding roller 123 and is driven by the driving motor 14, such that the driving motor 14 drives the first conveying member 111 and the second conveying member 121 so that the elongated plastic bag 3 is clamped by the first conveying member 111 and the second conveying member 121.

The seal unit 1 also includes a fixing member 15, and the fixing member 15 has a fixed seat 151, a movable seat 152, and a spring 153. The upper roller 112 is axially fixed in the movable seat 152, and the movable seat 152 is connected with the fixed seat 151 and vertically moves relative to the fixed seat 151. The spring 153 has two ends abutting against the fixed seat 151 and the movable seat 152, and the upper roller 112 is pushed by the spring 153 to abut against the lower roller 122 such that an opening of the elongated plastic bag 3 which is heated is sealed, and the spring 153 has a retractable elasticity so as to match with elongated plastic bags 3 with different thickness.

Also, the seal unit 1 further includes a mount 16, and the mount 16 has a fixed post 161, a movable post 162, and at least one resilient element 163. The fixed post 161 and the movable post 162 are defined between the first guiding roller 113 and the upper roller 112, and the fixed post 161 is fitted with the first conveying member 111. The movable post 162 is coupled with the fixed post 161 and vertically moves relative to the fixed post 161. The resilient element 163 has two ends abutting against the fixed post 161 and the movable post 162. A bottom surface of the first conveying member 111 is pushed by the resilient element 163 to abut against a top surface of the second conveying member 121, such that the elongated plastic bag 3 is clamped so that the first conveying member 111 and the second conveying member 121 drive the elongated plastic bag 3, and the resilient element 163 has a retractable elasticity so as to match with the elongated plastic bags 3 with different thickness.

The upper roller 112 has a plurality of press strips 114 for sealing the elongated plastic bag 3, thus obtaining a sealing effect.

The seal unit 1 includes a guide slideway 17 corresponding to the slot 133, and the guide slideway 17 has a hole 171 formed on an input end thereof so as to feed the elongated plastic bag 3 and has a predetermined contacting position for corresponding to the slot 133 as the elongated plastic bag 3 is fed into the guide slideway 17.

An improvement of the sealing machine of the present invention comprises a base 2 for receiving the seal unit 1, and the base 2 has an inlet 21 for putting the seal unit 1 into the base 2 and a control panel 22 for adjusting a temperature of the at least one electric bar 132.

Referring further to FIGS. 4-8, in operation, the elongated plastic bag 3 is horizontally put into the sealing machine from the inlet 21 so that the elongated plastic bag 3 corresponds to two input ends of the first conveying member 111 and the second conveying member 121, and the opening of the elongated plastic bag 3 corresponds to an inlet end of the slot 133 so that the first conveying member 111 and the second conveying member 121 clamp the elongated plastic bag 3 and convey the elongated plastic bag 3 to two output ends of the upper transporting set 11 and the lower transporting set 12, and the opening of the elongated plastic bag 3 is melted by the at least one electric bar 132 in the slot 133, thereafter the elongated plastic bag 3 is removed from the slot 133 and is pressed and sealed by the upper roller 112 and the lower roller 122.

Thereby, the sealing machine with the transportation structure contains the first conveying member 111 and the second conveying member 121 so as to clamp and convey the elongated plastic bags 3 with different sizes, and then the elongated plastic bags 3 are sealed by the upper roller 112 and the lower roller 122.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A sealing machine with a transportation structure comprising: a seal unit, the seal unit including an upper transporting set, a lower transporting set, a heating set, and a driving motor;

the upper transporting set having a first conveying member driven by the driving motor, the lower transporting set having a second conveying member driven by the driving motor, and the first conveying member and the second conveying member being used to clamp a plastic bag, the upper transporting set having an upper roller disposed on an output end thereof, and the lower transporting set having a lower roller mounted on an output end thereof so as to match with the upper roller and used to press the plastic bag which is heated by the heating set;

the heating set having at least a heating rail and at least one electric heating element, each heating rail horizontally extending along a conveying track of the first conveying member and the second conveying member, a slot defined between the two heating rails to accept the plastic bag which is heated and to correspond to a clamping surface of the first conveying member and the second conveying member, an outlet end of the slot corresponding to a pressing surface of the upper roller and the lower roller, at least one heating rail having a groove formed therein so as to receive the at least one electric heating element;

wherein the first conveying member and the second conveying member clamp the plastic bag and convey the plastic bag to the two output ends of the upper transporting set and the lower transporting set, and an opening of the elongated plastic bag is melted by the at least one electric heating element in the slot, and thereafter the elongated plastic bag exits from the slot and is pressed and sealed by the upper roller and the lower roller.

2. The sealing machine as claimed in claim 1, wherein the upper transporting set further comprises a first guiding roller, and two ends of the first conveying member engage with the upper roller and the first guiding roller, and the lower transporting set further comprises a second guiding roller, and two ends of the second conveying member engage with the lower roller and the second guiding roller, the first guiding roller engaging with the second guiding roller and being driven by the driving motor.

3. The sealing machine as claimed in claim 1, wherein the seal unit further includes a mount, and the mount has a fixed post, a movable post, and at least one resilient element; the fixed post and the movable post are disposed between the first guiding roller and the upper roller, and the fixed post is coupled to the first conveying member; the movable post is coupled to the fixed post and vertically moves relative to the fixed post; the resilient element elastically biases the movable post towards the first conveying member such that the resilient element causes a bottom surface of the first conveying member to abut against a top surface of the second conveying member.

4. The sealing machine as claimed in claim 1, wherein the seal unit further includes a fixing member, and the fixing member has a fixed seat, a movable seat, and a spring; the upper roller is axially fixed in the movable seat, the movable seat is connected to the fixed seat and vertically moves relative to the fixed seat, and the spring has two ends respectively abutting against the fixed seat and the movable seat, the upper roller being pushed by the spring to abut against the lower roller.

5. The sealing machine as claimed in claim 1, wherein the upper roller has a plurality of press strips for sealing the plastic bag.

6. The sealing machine as claimed in claim 1, wherein the seal unit further includes a guide slideway corresponding to the slot, and the guide slideway has an opening formed on an input end thereof.

7. The sealing machine as claimed in claim 1 further comprising a base for receiving the seal unit, the base comprising an inlet for accepting the seal unit and a control panel for adjusting a temperature of the at least one electric heating element.

* * * * *